United States Patent
Xu et al.

(10) Patent No.: US 9,882,703 B1
(45) Date of Patent: Jan. 30, 2018

(54) RESOLVING META-STABILITY IN A CLOCK AND DATA RECOVERY CIRCUIT

(71) Applicant: Xilinx, Inc., San Jose, CA (US)

(72) Inventors: Yu Xu, Palo Alto, CA (US); Winson Lin, Daly City, CA (US); Caleb S. Leung, San Jose, CA (US); Alan C. Wong, San Jose, CA (US); Christopher J. Borrelli, Los Gatos, CA (US); Yohan Frans, Palo Alto, CA (US); Kun-Yung Chang, Los Altos Hills, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 15/346,434

(22) Filed: Nov. 8, 2016

(51) Int. Cl.
| | |
|---|---|
| *H03D 3/24* | (2006.01) |
| *H04L 7/00* | (2006.01) |
| *H04L 12/26* | (2006.01) |
| *H04L 7/033* | (2006.01) |

(52) U.S. Cl.
CPC ............ *H04L 7/0012* (2013.01); *H04L 7/033* (2013.01); *H04L 43/028* (2013.01); *H04L 43/16* (2013.01)

(58) Field of Classification Search
CPC ....... H03L 7/091; H03L 7/0814; H03L 7/093; H03L 7/087; H03L 7/00; H03L 7/085; H03L 7/089; H03L 7/0998; H03L 7/1072; H03L 7/145; H03L 7/183; H03L 7/1976; H04L 7/0025; H04L 7/0331; H04L 7/0337; H04L 2025/03598; H04L 2025/03681; H04L 7/0008; H04L 7/0012; G06F 1/04
See application file for complete search history.

(56) References Cited

U.S. PATENT DOCUMENTS

| | | | | |
|---|---|---|---|---|
| 9,209,962 | B1 * | 12/2015 | Mishra | H03K 5/135 |
| 9,264,219 | B1 * | 2/2016 | Kang | H03L 7/091 |
| 2004/0202261 | A1 * | 10/2004 | Gregorius | H03L 7/0812 |
| | | | | 375/354 |
| 2004/0202266 | A1 * | 10/2004 | Gregorius | H03L 7/07 |
| | | | | 375/355 |
| 2014/0266338 | A1 * | 9/2014 | Malipatil | H03L 7/00 |
| | | | | 327/155 |
| 2015/0162922 | A1 * | 6/2015 | Song | H04L 7/0091 |
| | | | | 375/376 |

* cited by examiner

*Primary Examiner* — Khanh C Tran
(74) *Attorney, Agent, or Firm* — Robert M. Brush

(57) ABSTRACT

An example method of clock and data recovery in a receiver includes generating data samples and crossing samples of a received signal based on a data phase and a crossing phase, respectively, of a sampling clock supplied by a phase interpolator in the receiver; generating a phase detect result signal in response to phase detection of the data samples and the crossing samples; filtering the phase detect result signal to generate a phase interpolator code, the phase interpolator generating the sampling clock based on the phase interpolator code; determining an average phase detect result from the phase detect result signal; and adjusting the phase interpolator code in response to the average phase detect result being less than a threshold value.

20 Claims, 7 Drawing Sheets

RESOLVING META-STABILITY IN A CLOCK AND DATA RECOVERY CIRCUIT

TECHNICAL FIELD

Examples of the present disclosure generally relate to electronic circuits and, in particular, to resolving meta-stability in a clock and data recovery (CDR) circuit.

BACKGROUND

High-speed data communication systems frequently rely on clock and data recovery (CDR) circuits within the receiver rather than transmitting a reference clock with the data. For example, serial data communication may include the use of a serializer-deserializer (SERDES) at each end of a communication link. Within a SERDES, a CDR may extract a clock that is embedded in the incoming data stream. Once a clock is recovered, the clock is used to sample the incoming data stream to recover individual bits.

A bang-bang CDR scheme is widely used in digital logic to identify the best dock phase to capture the received data. In a bang-bang CDR scheme, the received signal is oversampled to obtain data samples and crossing samples (also referred to as edge samples). A bang-bang CDR uses the data samples and the crossing samples to determine if the data sampling phase should be adjusted, in which direction the data sampling phase should be adjusted, and where to stop the adjustment. Once the data sampling phase dithers around the "best" sampling position, the bang-bang CDR is locked.

There is a scenario where the data sampling phase falls at the crossing area when the system starts, which results in a longer time to lock. This condition is referred to as meta-stability. In the meta-stable condition, the phase detector in the CDR may not effectively generate decisive signals to push the CDR to lock quickly. Eventually, the CDR can exit the meta-stable state and lock to the correct phase due to external interference, but the lock times can be long. It is desirable to minimize lock times and avoid meta-stable conditions in a CDR circuit.

SUMMARY

Techniques for resolving meta-stability in a clock and data recovery (CDR) circuit are described. In an example, a method of clock and data recovery in a receiver includes generating data samples and crossing samples of a received signal based on a data phase and a crossing phase, respectively, of a sampling clock supplied by a phase interpolator in the receiver; generating a phase detect result signal in response to phase detection of the data samples and the crossing samples; filtering the phase detect result signal to generate a phase interpolator code, the phase interpolator generating the sampling clock based on the phase interpolator code; determining an average phase detect result from the phase detect result signal; and adjusting the phase interpolator code in response to the average phase detect result being less than a threshold value.

In another example, a CDR circuit includes a phase detector configured to generate a phase detect result signal in response to phase detection of data samples and crossing samples of a received signal, the data samples and the crossing samples being generated based on a data phase and a crossing phase, respectively, or a sampling clock supplied by a phase interpolator; a digital loop filter configured to generate a phase interpolator code for controlling the phase interpolator; and a control circuit configured to determine an average phase detect result from the phase detect result signal and adjust the phase interpolator code in response to the average phase detect result being less than a threshold value.

In another example, a receiver includes sampling circuitry configured to generate data samples and crossing samples of a received signal based on a data phase and a crossing phase, respectively, of a sampling clock; a phase interpolator configured to supply the sampling clock in response to a phase interpolator code; a phase detector configured to generate a phase detect result signal in response to the data samples and the crossing samples; a digital loop filter configured to filter the phase detect result signal to generate the phase interpolator code; and a control circuit configured to determine an average phase detect result from the phase detect result signal and adjust the phase interpolator code in response to the average phase detect result being less than a threshold value.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
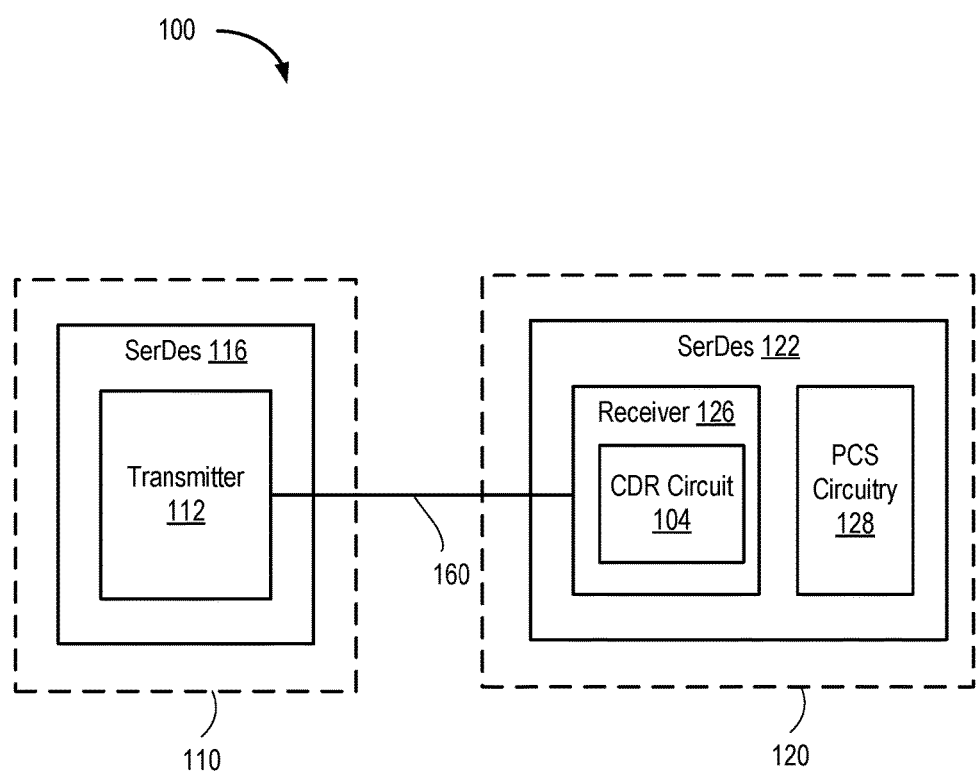
FIG. 1 is a block diagram depicting an example of a serial communication system.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described.

Techniques for resolving meta-stability in a clock and data recovery (CDR) circuit are described. In an example, a receiver generates data samples and crossing samples of a received signal based on a data phase and a crossing phase, respectively, of a sampling clock supplied by a phase interpolator. A phase detector generates a phase detect result signal in response to phase detection of the data samples and the crossing samples. A digital loop filter filters the phase detect result signal to generate a phase interpolator code. The phase interpolator generates the sampling clock based on the phase interpolator code. A control circuit determines an average phase detect result from the phase detect result signal. The control circuit adjusts the phase interpolator code in response to the average phase detect result being less than a threshold value. By intentionally adjusting the phase interpolator code, the control circuit pushes the CDR circuit towards locking and out of a meta-stable condition. This allows the receiver to lock to the correct data sampling phase quicker than waiting for random external interference to cause an exit from the meta-stable state. These and further aspects are described below with respect to the drawings.

FIG. 1 is a block diagram depicting an example of a serial communication system 100. The serial communication system 100 comprises a transmitter 112 coupled to a receiver 126 over transmission medium 160. The transmitter 112 can be part of a serializer-deserializer (SerDes) 116. The receiver 126 can be part of a SerDes 122. The transmission medium 160 comprises an electrical path between the transmitter 112 and the receiver 126 and can include printed circuit board (PCB) traces, vias, cables, connectors, decoupling capacitors, and the like. The receiver of the SerDes 116, and the transmitter of the SerDes 122, are omitted for clarity. In some examples, the SerDes 116 can be disposed in an integrated circuit (IC) 110, and the SerDes 122 can be disposed in an IC 120.

The transmitter 112 drives serial data onto the transmission medium 160 using a digital baseband modulation technique. In general, the serial data is divided into symbols. The transmitter 112 converts each symbol into an analog voltage mapped to the symbol. The transmitter 112 couples the analog voltage generated from each symbol to the transmission medium 160. In some examples, the transmitter 112 uses a binary non-return-to-zero (NRZ) modulation scheme. In binary NRZ, a symbol is one bit of the serial data and two analog voltages are used to represent each bit. In other examples, the transmitter uses multi-level digital baseband modulation techniques, such as pulse amplitude modulation (PAM), where a symbol includes a plurality of bits of the serial data and more than two analog voltages are used to represent each bit.

The receiver 126 generally includes a clock and data recovery (CDR) circuit 104. An example structure of the receiver 126 is described further below with respect to FIG. 2. The receiver 126 receives an analog signal from the transmission medium 160. The CDR circuit 104 operates to recover data and a clock from the analog signal. The receiver 126 provides the recovered data to physical coding sublayer (PCS) circuitry 128 in SerDes 122 for decoding and further processing.

Figure 2:
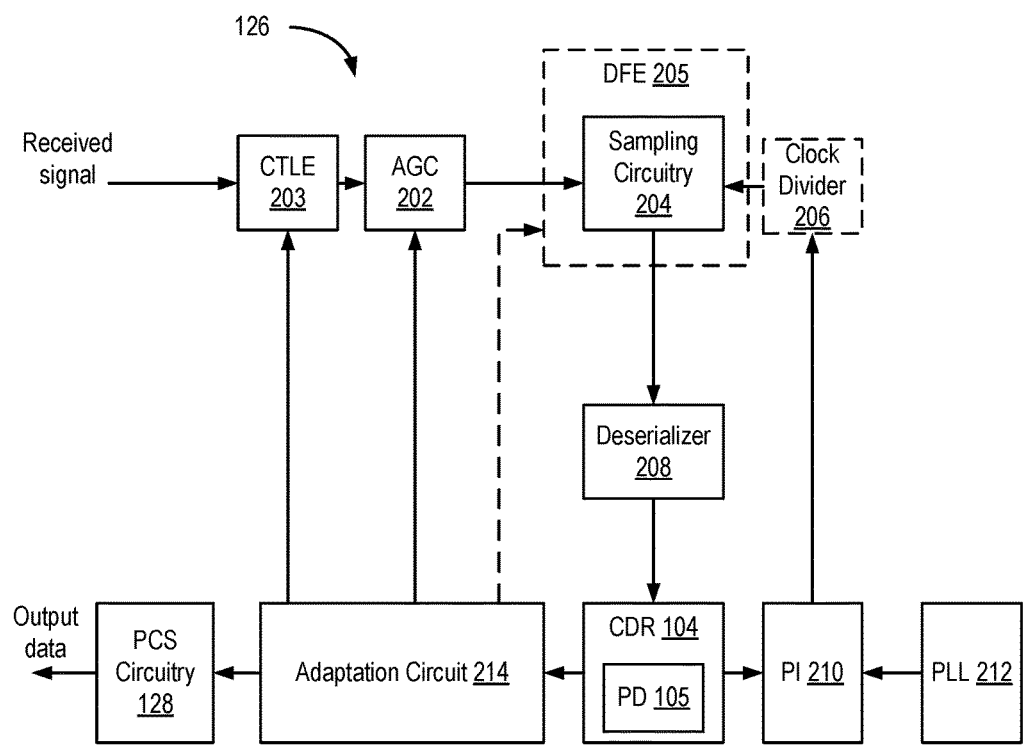
FIG. 2 is a block diagram depicting a receiver according to an example.

FIG. 2 is a block diagram depicting the receiver 126 according to an example. The receiver 126 includes a continuous time linear equalizer (CTLE) 203, an automatic gain control (AGC) circuit 202, sampling circuitry 204, deserializer 208, the CDR circuit 104, a phase interpolator (PI) 210, and an adaptation circuit 214. An output of the CTLE 203 is coupled to an input of the AGC circuit 202. An output of the AGC circuit 202 is coupled to inputs of the sampling circuitry 204. An output of the clock divider 206 is coupled to inputs of the sampling circuitry 204. An output the sampling circuitry 204 is coupled to an input of the deserializer 208. An output of the deserializer 208 is coupled to an input of the CDR circuit 104. Outputs of the CDR circuit 104 are coupled to an input of the adaptation circuit 214 and an input of the PI 210, respectively. Another input of the PI 210 is coupled to an output of a phase locked loop (PLL) circuit 212. In an example, an output of the PI 210 is coupled to an input of the sampling circuitry 204. In another example, the output of the PI 210 is coupled to an input of a clock divider 206, and an output of the clock divider 206 is coupled to an input of the sampling circuitry 204. Outputs of the adaptation circuit 214 are coupled to the CTLE 203, the AGC circuit 202, and the PCS circuitry 128, respectively. In an example, the sampling circuitry 204 can be part of a decision feedback equalizer (DFE) 205. In such case, another output of the adaptation circuit 214 is coupled to the DFE 205.

In operation, the CTLE 203 receives an analog signal from the transmission medium 160. The CTLE 203 operates as a high-pass filter to compensate for the low-pass characteristics of the transmission medium 160. The peak of the frequency response of the CTLE 203 can be adjusted based on a CTLE adjust signal provided by the adaptation circuit 214. The AGC circuit 202 receives the equalized analog signal from the CTLE 203. The AGC circuit 202 adjusts the gain of the equalized signal based on a gain adjust signal provided by the adaptation circuit 214. In another example, the AGC circuit 202 can precede the CTLE circuit 203.

The sampling circuitry 204 generates data and crossing samples from the output of the AGC circuit 202 based on a sampling clock signal supplied by the PI 210. The sampling circuitry 204 can generate the data samples using a data sampling clock and the crossing samples using a crossing sampling clock, where the crossing sampling clock is shifted in phase from the data sampling clock by 90 degrees. The sampling circuitry 204 can generate both the data and crossing sampling clocks from the sampling clock signal supplied by the PI 210 (e.g., using a 90 degree phase shifter). Alternatively, the PI 210 can supply a sampling clock signal that includes both the data and crossing sampling clocks. In another example, the clock divider 206 can generate the data and crossing sampling clocks from the sampling clock signal supplied by the PI 210. The clock divider 206, if present, can also reduce the frequency of the sampling clock signal supplied by the PI 210. In example, the sampling circuitry 204 is part of the DFE 205. The DFE 205 equalizes the output of the AGC circuit 202 to minimize inter-symbol interference (ISI).

Each data and crossing sample includes one or more bits depending on the type of modulation scheme employed (e.g., one bit samples for binary NRZ and multi-bit samples for PAM). The deserializer 208 groups data samples and crossing samples to generate a deserialized signal. The deserializer 208 unifies the two separate parallel data and crossing sample streams into a deserialized signal to be processed by the CDR circuit 104.

Figure 3:
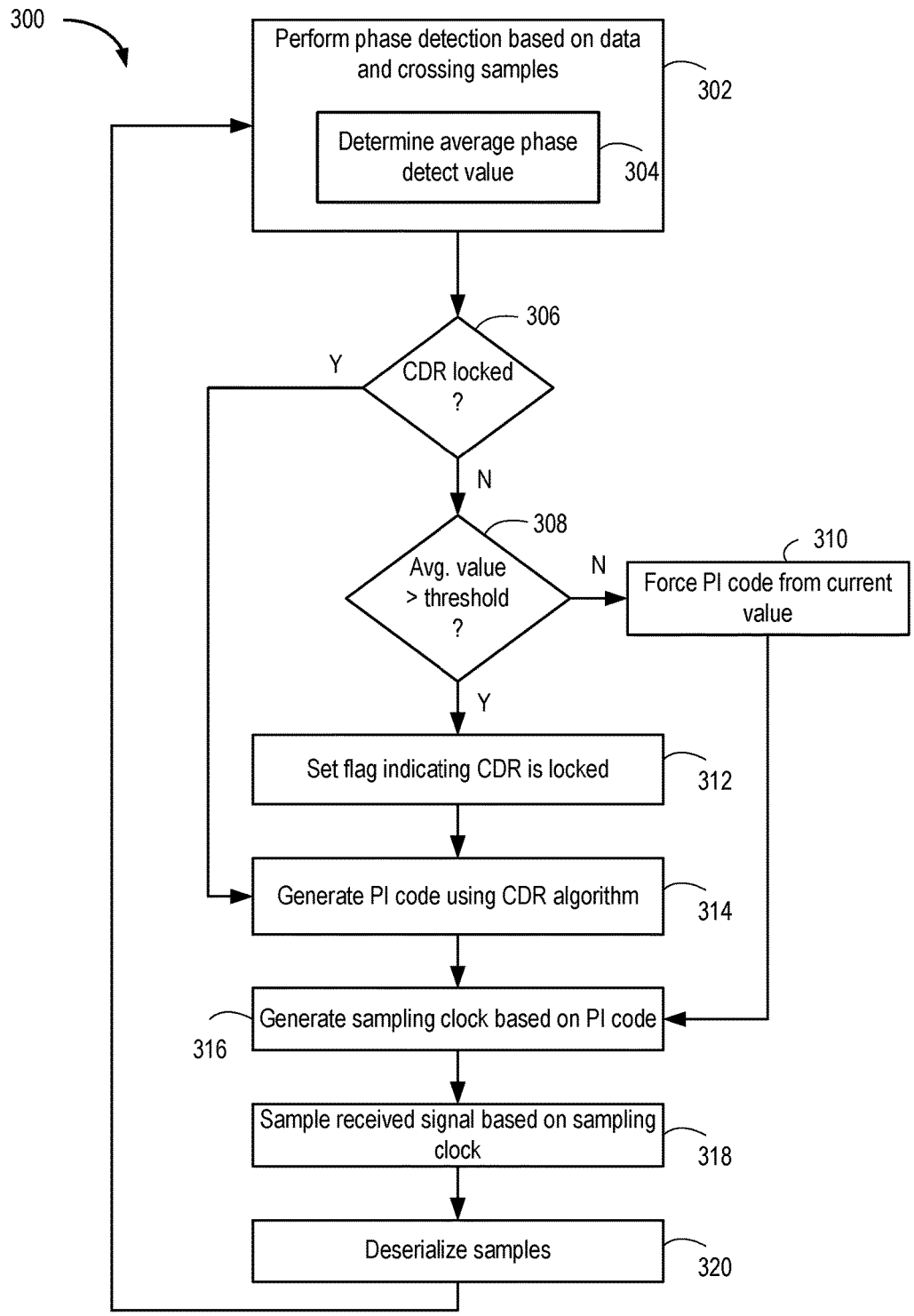
FIG. 3 is a flow diagram depicting a method of clock and data recovery according to an example.
Figure 4:
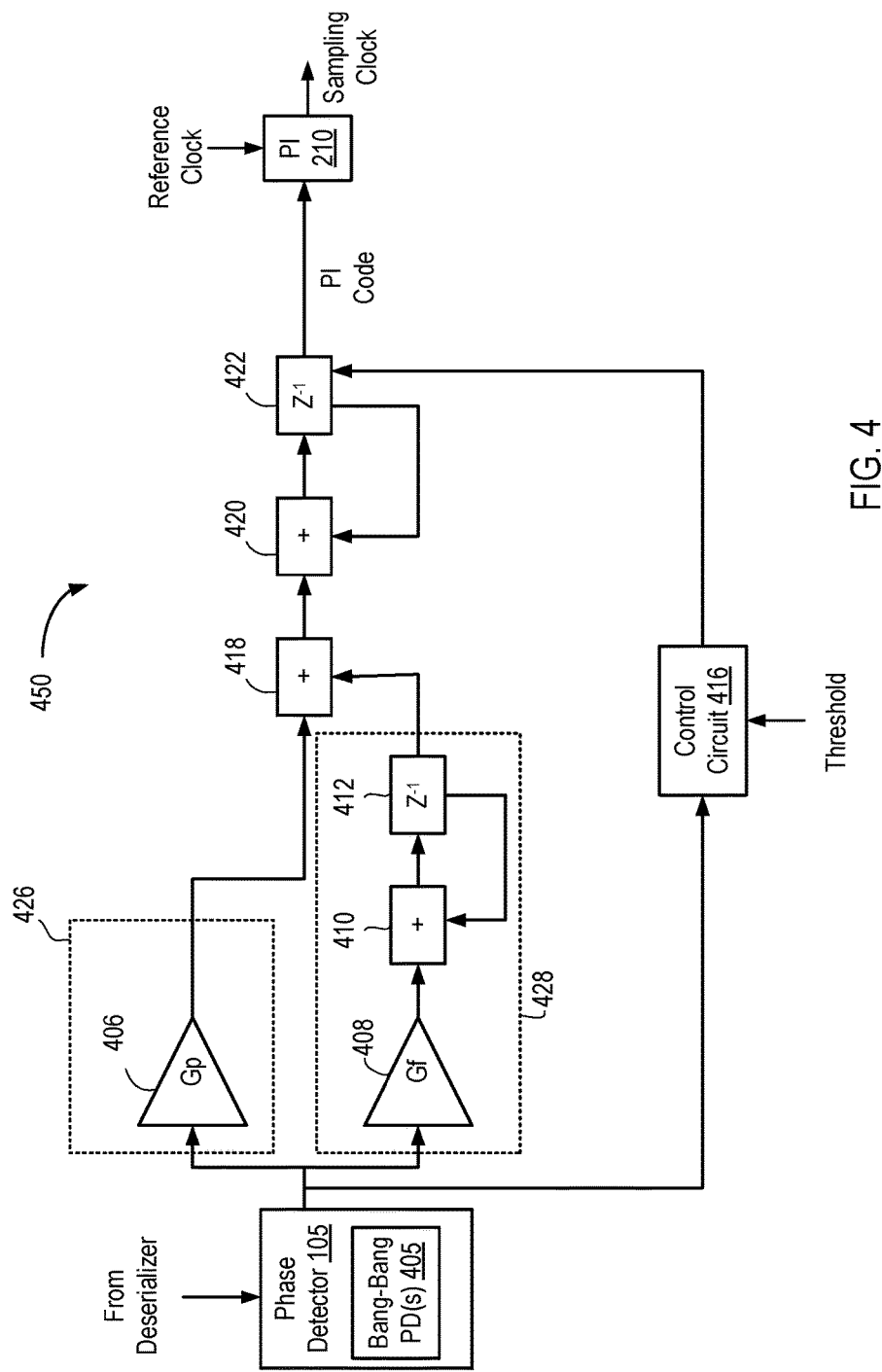
FIG. 4 is a block diagram depicting a CDR circuit according to an example.

The CDR circuit 104 generates a PI code signal from the deserialized signal generated by the deserializer 208. Operation of the CDR circuit 104 is shown in FIG. 3 and described below. An example of the CDR circuit 104 is shown in FIG. 4 and described below. The PI 210 receives a reference clock signal from the PLL 212. The PI 210 shifts the phase of the reference clock signal based on the PI code signal output by the CDR circuit 104. The PI 210 outputs the phase-shifted reference clock signal as the sampling clock signal.

The CDR circuit 104 outputs a data signal to the adaptation circuit 214. The data signal includes the data samples output by the sampling circuitry 204. The adaptation circuit 214 generates control signals for the CTLE 203 and the AGC circuit 202 based on data signal using known algorithms. If the DFE 205 is present, the adaptation circuit 214 generates a control signal for adjusting the taps of the DFE 205 using a known algorithm. The adaptation circuit 214 outputs the data signal to the PCS circuitry 128. The PCS circuitry 128 processes the data signal to recover the transmitted data.

Figure 5:
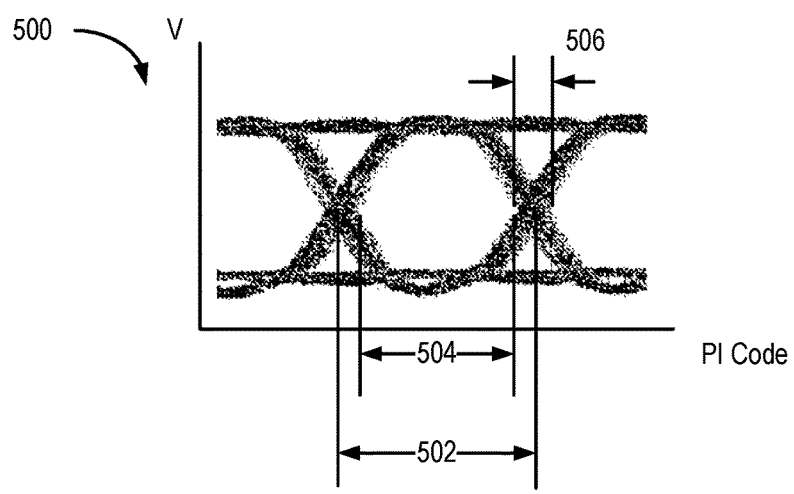
FIG. 5 is a plot of an eye diagram according to an example.

FIG. 5 is a plot of an eye diagram 500 according to an example. The eye diagram 500 includes a vertical axis representing voltage (V) of the received signal and a horizontal axis representing PI code (e.g., sampling phase). The eye diagram 500 shows an eye 502 that includes an eye opening 504 and a crossing region 506. For the best margin, it is desirable to capture data by placing the data sampling phase and the crossing sampling phase at the centers of the eye opening 504 and the crossing region 506, respectively.

In an example, the CDR circuit 104 includes a phase detector (PD) 105. The phase detector 105 determines whether to adjust the data sampling phase and in which direction the data sampling phase should be adjusted. In an example, the phase detector 105 includes at least one bang-bang phase detector each operating on a pair of data bits and a crossing bit. A bang-bang phase detector operates according to the following truth table:

TABLE 1

| Current Bit | Crossing Bit | Next Bit | Processing |
|---|---|---|---|
| 0 | 1 | 1 | Data sampling phase is late, needs to move left |
| 1 | 0 | 0 | Data sampling phase is late, needs to move left |
| 0 | 0 | 1 | Data sampling phase is early, needs to move right |
| 1 | 1 | 0 | Data sampling phase is early, needs to move right |

The phase detector 105 generates a phase detect result signal. The phase detect result signal provides a net phase detect result from the bang-bang phase detectors.

Figure 6A:
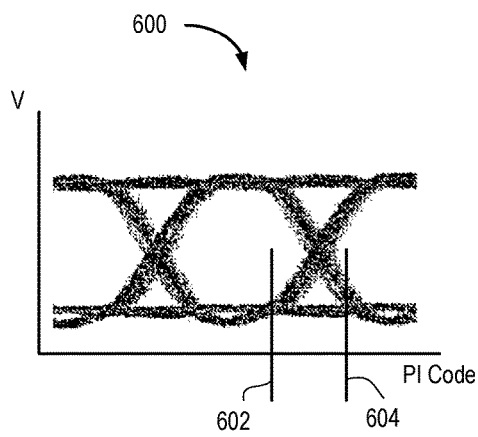
FIG. 6A is a plot of an eye diagram showing an example where the data sampling phase is late.
Figure 6B:
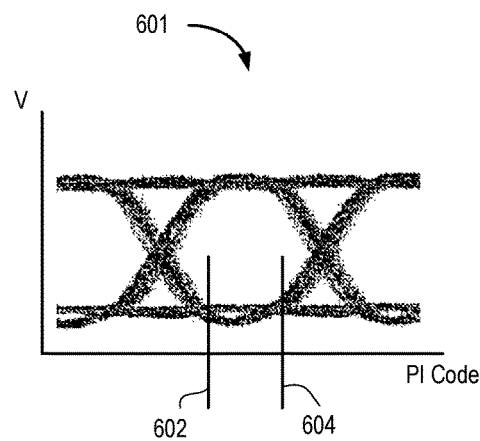
FIG. 6B is a plot of an eye diagram showing an example where the data sampling phase is early.

FIG. 6A is a plot of an eye diagram 600 showing an example where the data sampling phase is late. As shown in FIG. 6A, a data sampling phase 602 is disposed to the right of the center of the data eye. Likewise, a crossing sampling phase 604 is disposed to the right of the crossing region. FIG. 6B is a plot of an eye diagram 601 showing an example where the data sampling phase is early. As shown in FIG. 6B, the data sampling phase 602 is disposed to the left of the center of the data eye. Likewise, the crossing sampling phase 604 is disposed to the left of the crossing region.

Figure 7A:
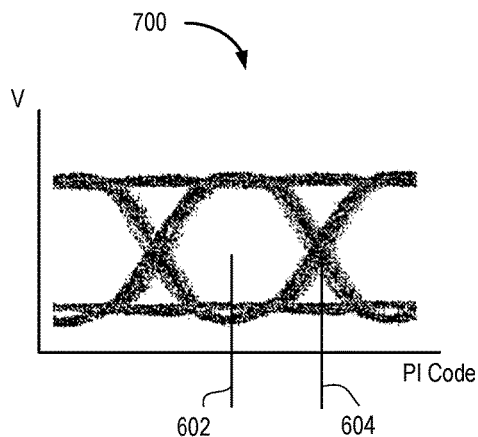
FIG. 7A is a plot of an eye diagram showing an example where the data sampling phase is in the center of the data eye.
Figure 7B:
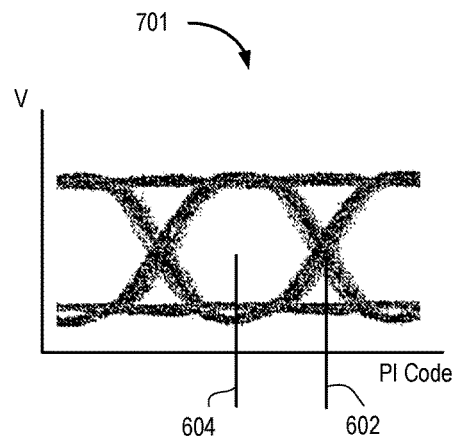
FIG. 7B is a plot of an eye diagram showing an example where the data sampling phase and the crossing sampling phase are flipped.

In the scenarios of FIGS. 6A and 6B, the phase detector 105 can detect the early and late conditions and the CDR circuit 104 can adjust the PI code to achieve the correct data sampling phase (e.g., the center of the data eye). FIG. 7A is a plot of an eye diagram 700 showing an example where the data sampling phase is in the center of the data eye. As shown in FIG. 7A, the data sampling phase 602 is disposed in the center of the data eye and the crossing sampling phase is disposed in the crossing region. In such a scenario, the CDR circuit 104 is considered locked. The data sampling phase then dithers around the locked position once lock is achieved. It is possible when the receiver is powered that the data and crossing sampling phases are flipped, as shown in FIG. 7B. FIG. 7B is a plot of an eye diagram 701 showing an example where the data sampling phase 602 and the crossing sampling phase 604 are flipped. In such case, the crossing sampling phase 604 is disposed in the center of the data eye, and the data sampling phase 602 is disposed in the crossing region. This scenario is referred to as a meta-stable condition.

In the meta-stable condition, without the compensation technique described herein, the CDR circuit 104 may not be able to make a decisive decision to move the data sampling phase to the locking position within a threshold time, which extends the locking time even with data transitions. An external disturbance will eventually make the CDR circuit 104 transition out of the meta-stable state and to the locked state. However, the extended locking time is deleterious, especially for locking-time sensitive applications.

Analysis reveals that for most cases, the net phase detect result (the difference between phase moving signals right and left from the bang-bang phase detectors) is moderately away from zero. This provides a decisive indication to drive the data sampling phase toward its locked position. On the other hand, the net phase detect result could be close to zero when the CDR is either locked or in the meta-stable state. The meta-stable state normally makes the locking-time significantly longer than usual.

FIG. 3 is a flow diagram depicting a method 300 of clock and data recovery according to an example. The method 300 can be performed by the receiver 126 described above. The method 300 begins at step 302, where the CDR circuit 104 performs phase detection based on data and crossing samples. During step 302, at step 304, the CDR circuit 104 determines an average phase detect value. For example, the CDR circuit 104 can average the phase detect result signal output by the phase detector 105 over a number of samples. At step 306, the CDR circuit 104 determines if the locked state has been detected. If not, the method 300 proceeds from step 306 to step 308. Otherwise, the method 300 proceeds from step 306 to step 314.

At step 308, the CDR circuit 104 determines if the average phase detect value is greater than a threshold value. If not, the method 300 proceeds from step 308 to step 310, where the CDR circuit 104 forces the PI code from the current value. In this manner, the CDR circuit 104 attempts to exit the meta-stable state. The method 300 proceeds from step 310 to step 316. If the average phase detect value is greater than the threshold value, the method 300 proceeds from step 308 to step 312.

At step 312, the CDR circuit 104 sets a flag indicating that the CDR is locked. That is, at step 312, the CDR circuit 104 determines that the CDR is in the locked state, rather than the meta-stable state. At step 314, the CDR circuit 104 generates a PI code using a CDR algorithm. An example CDR algorithm is described below with respect to FIG. 4. At step 316, the PI 210 generates a sampling clock based on the PI code. At step 318, the sampling circuitry 204 samples the received signal based on the sampling clock. At step 320, the deserializer 208 deserializes the data and crossing streams. The method 300 returns to step 302 and repeats.

As shown in the method 300, maintains a running average of the phase detect value generated by the phase detector 105. The averaging process filters out the randomness of the phase detect result. If this average phase detect value is less than a threshold, this indicates that the CDR circuit 104 is in a meta-stable state. Thus, the CDR circuit 104 forces the PI code from the current value (either increasing or decreasing the PI code) in an attempt to exit the meta-stable state. If the average phase detect value is large enough (greater than the threshold), then the CDR circuit 104 can use the normal CDR algorithm to generate the PI code and achieve the lock state. Once the lock state is achieved, the average phase detect value will again be smaller than the threshold. However, in such case, the CDR circuit 104 sets the lock flag so that the CDR circuit 104 continues to execute the normal CDR algorithm, rather than intentionally adjusting the PI code. In this manner, the CDR circuit 104 can achieve the lock state quickly even if the CDR circuit 104 starts in the meta-stable state.

FIG. 4 is a block diagram depicting the CDR circuit 104 according to an example. The CDR circuit 104 includes the phase detector 105, a digital loop filter 450, and a control circuit 416. An input of the phase detector 105 is coupled to the output of the deserializer 208. An output of the phase detector 105 is coupled to the digital loop filter 450. An output of the digital loop filter 450 provides a PI code signal, which is coupled to the input of the PI 210. The output of the PI 210 provides the sampling clock signal, as described above. The phase detector 105 includes at least one bang-bang phase detector 405.

In an example, the digital loop filter 450 includes a gain circuit 406, a gain circuit 408, an adder 410, a delay element 412, an adder 418, an adder 420, and a delay element 422. The gain circuit 406 implements a phase path 427. The gain circuit 408, the adder 410, and the delay element 412 implement a frequency path 428. Inputs to the gain circuits 406 and 408 are coupled to an output of the phase detector 105. An output of the gain circuit 406 is coupled to an input of the adder 418. An output of the gain circuit 408 is coupled to an input of the adder 410. An output of the adder 410 is coupled to an input of the delay element 412. An output of the delay element 412 is coupled to another input of the adder 410 and to another input of the adder 418. An output of the adder 418 is coupled to an input of the adder 420. An output of the adder 420 is coupled to an input of the delay element 422. An output of the delay element 422 is coupled to another input of the adder 420 and to an input of the PI 210. Another input of the delay element 422 is coupled to an output of the control circuit 416. An input of the control circuit 416 is coupled to the output of the phase detector 105.

In operation, the phase detector 105 generates a net phase detect result on the data and crossing samples in the deserialized data. The phase detector 105 can include a plurality of bang-bang phase detectors 405 each generating an individual phase detect result based on a pair of data samples and a crossing sample. The bang-bang phase detectors can generate individual phase detect results using different sets of data/crossing samples. The phase detector 105 combines the individual phase detect results to generate the net phase detect result. The phase detector 105 outputs a phase detect result signal having the net phase detect result to the digital loop filter 450 and the control circuit 416.

The digital loop filter 450 performs a CDR algorithm to adjust the PI code based on the phase detect result signal. The gain circuit 406 applies a phase gain (Gp) to the phase detect result signal. For example, the gain circuit 406 can implement a left-shift operation to apply the phase gain. The gain circuit 408 applies a frequency gain (Gf) to the phase detect result signal. For example, the gain circuit 408 can implement a left-shift operation to apply the frequency gain. The output of the gain circuit 408 is integrated by the adder 410 and the delay element 412. The integrated output of the frequency path 428 is added to the output of the phase path 427 by the adder 418. The output of the adder 418 is integrated by the adder 420 and the delay element 422. The control circuit 416 can implement the CDR algorithm by not adjusting the PI code signal output by the delay element 422.

The control circuit 416 also receives the phase detect result signal from the phase detector 105. The control circuit 416 generates an average phase detect result signal. The control circuit 416 compares the average phase detect result to a threshold. The threshold used by the control circuit 416 can be programmable and can be received by a threshold input to the control circuit 416. If the average phase detect result is below the threshold, the control circuit 416 adjusts the PI code output by the delay element 422 in a certain direction (increase or decrease). If the average phase detect result is above the threshold, the control circuit 416 does not adjust the PI code. The control circuit 416 maintains a flag to indicate when the lock condition has been detected. The control circuit 416 can be implemented using various digital logic circuits to perform the functions described above.

Figure 8:
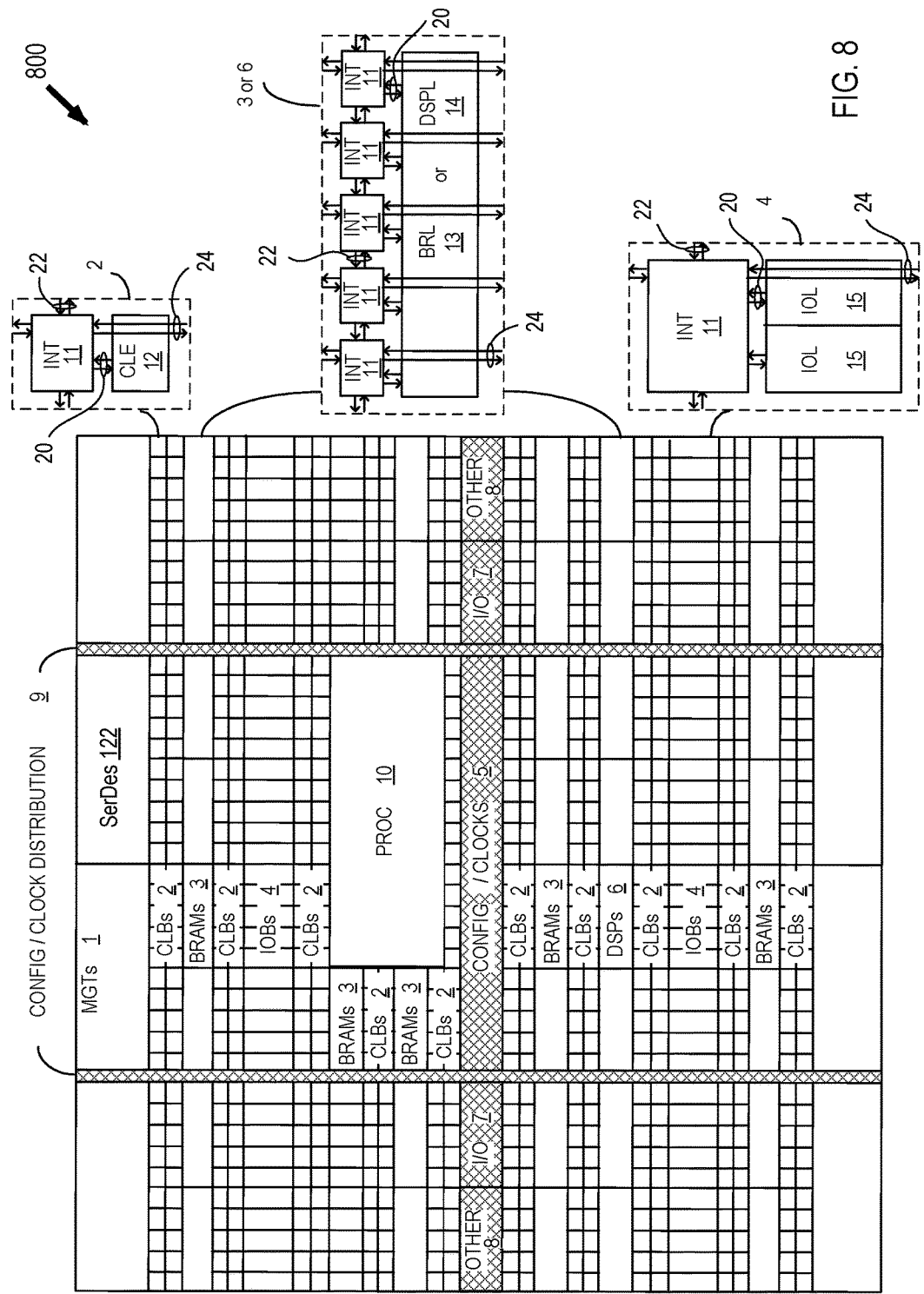
FIG. 8 illustrates an architecture of field programmable gate array (FPGA) in which the example SerDes described herein can be employed.

The SerDes 122 described above can be implemented within an integrated circuit, such as a field programmable gate array (FPGA) or like type programmable circuit. FIG. 8 illustrates an architecture of FPGA 800 that includes a large number of different programmable tiles including multi-gigabit transceivers ("MGTs") 1, configurable logic blocks ("CLBs") 2, random access memory blocks ("BRAMs") 3, input/output blocks ("IOBs") 4, configuration and clocking logic ("CONFIG/CLOCKS") 5, digital signal processing blocks ("DSPs") 6, specialized input/output blocks ("I/O") 7 (e.g., configuration ports and clock ports), and other programmable logic 8 such as digital clock managers, analog-to-digital converters, system monitoring logic, and so forth. Some FPGAs also include dedicated processor blocks ("PROC") 10. FPGA 800 can include one or more instances of SerDes 122 described above.

In some FPGAs, each programmable tile can include at least one programmable interconnect element ("INT") 11 having connections to input and output terminals 20 of a programmable logic element within the same tile, as shown by examples included at the top of FIG. 1. Each programmable interconnect element 11 can also include connections to interconnect segments 22 of adjacent programmable interconnect element(s) in the same tile or other tile(s). Each programmable interconnect element 11 can also include connections to interconnect segments 24 of general routing resources between logic blocks (not shown). The general routing resources can include routing channels between logic blocks (not shown) comprising tracks of interconnect segments (e.g., interconnect segments 24) and switch blocks (not shown) for connecting interconnect segments. The interconnect segments of the general routing resources (e.g., interconnect segments 24) can span one or more logic blocks. The programmable interconnect elements 11 taken together with the general routing resources implement a programmable interconnect structure ("programmable interconnect") for the illustrated FPGA.

In an example implementation, a CLB 2 can include a configurable logic element ("CLE") 12 that can be programmed to implement user logic plus a single programmable interconnect element ("INT") 11. A BRAM 3 can include a BRAM logic element ("BRL") 13 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 6 can include a DSP logic element ("DSPL") 14 in addition to an appropriate number of programmable interconnect elements. An 10B 4 can include, for example, two instances of an input/output logic element ("IOL") 15 in addition to one instance of the programmable interconnect element 11. As will be clear to those of skill in the art, the actual I/O pads connected, for example, to the I/O logic element 15 typically are not confined to the area of the input/output logic element 15.

In the pictured example, a horizontal area near the center of the die (shown in FIG. 8) is used for configuration, clock, and other control logic. Vertical columns 9 extending from this horizontal area or column are used to distribute the clocks and configuration signals across the breadth of the FPGA.

Some FPGAs utilizing the architecture illustrated in FIG. 8 include additional logic blocks that disrupt the regular columnar structure making up a large part of the FPGA. The additional logic blocks can be programmable blocks and/or dedicated logic. For example, processor block 10 spans several columns of CLBs and BRAMs. The processor block 10 can various components ranging from a single microprocessor to a complete programmable processing system of microprocessor(s), memory controllers, peripherals, and the like.

Note that FIG. 8 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 8 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

While the foregoing is directed to specific examples, other and further examples may be devised without departing from the basic scope thereof, and the scope thereof is determined by the claims that follow.

What is claimed is:

1. A method of clock and data recovery in a receiver, comprising:
   generating data samples and crossing samples of a received signal based on a data phase and a crossing phase, respectively, of a sampling clock supplied by a phase interpolator in the receiver;
   generating a phase detect result signal in response to phase detection of the data samples and the crossing samples;
   filtering the phase detect result signal to generate a phase interpolator code, the phase interpolator generating the sampling clock based on the phase interpolator code;
   determining an average phase detect result from the phase detect result signal; and
   adjusting the phase interpolator code in response to the average phase detect result being less than a threshold value.

2. The method of claim 1, further comprising:
   suspending adjustment of the phase interpolator code in response to the average phase detect result being greater than the threshold value.

3. The method of claim 2, further comprising:
   determining that the data phase is locked to a center of a data eye after suspending adjustment of the phase interpolator code.

4. The method of claim 1, wherein the phase detection is performed by one or more bang-bang phase detectors.

5. The method of claim 4, wherein the one or more bang-bang phase detectors comprises a plurality of bang-bang phase detectors, and wherein the phase detect result signal is a combination of phase detect results output by the plurality of bang-bang phase detectors.

6. The method of claim 1, wherein the step of adjusting comprises at least one adjustment of the phase interpolator code.

7. The method of claim 1, wherein the step of adjusting is performed further in response to a determination that the data phase has not been locked to a center of a data eye.

8. A clock and data recovery (CDR) circuit, comprising:
   a phase detector configured to generate a phase detect result signal in response to phase detection of data samples and crossing samples of a received signal, the data samples and the crossing samples being generated based on a data phase and a crossing phase, respectively, or a sampling clock supplied by a phase interpolator;
   a digital loop filter configured to generate a phase interpolator code for controlling the phase interpolator; and
   a control circuit configured to determine an average phase detect result from the phase detect result signal and adjust the phase interpolator code in response to the average phase detect result being less than a threshold value.

9. The CDR circuit of claim 8, wherein the control circuit is further configured to suspend adjustment of the phase interpolator code in response to the average phase detect result being greater than the threshold value.

10. The CDR circuit of claim 9, wherein the control circuit is further configured to determine that the data phase is locked to a center of a data eye after suspending adjustment of the phase interpolator code.

11. The CDR circuit of claim 8, wherein the phase detector includes one or more bang-bang phase detectors.

12. The CDR circuit of claim 11, wherein the one or more bang-bang phase detectors comprises a plurality of bang-bang phase detectors, and wherein the phase detect result signal is a combination of phase detect results output by the plurality of bang-bang phase detectors.

13. The CDR circuit of claim 8, wherein the control circuit is configured to perform at least one adjustment of the phase interpolator code while the average phase detect result is less than the threshold value.

14. The CDR circuit of claim 8, wherein the control circuit is configured to adjust the phase interpolator code further in response to a determination that the data phase has not been locked to a center of a data eye.

15. A receiver, comprising:
   sampling circuitry configured to generate data samples and crossing samples of a received signal based on a data phase and a crossing phase, respectively, of a sampling clock;

a phase interpolator configured to supply the sampling clock in response to a phase interpolator code;

a phase detector configured to generate a phase detect result signal in response to the data samples and the crossing samples;

a digital loop filter configured to filter the phase detect result signal to generate the phase interpolator code; and a control circuit configured to determine an average phase detect result from the phase detect result signal and adjust the phase interpolator code in response to the average phase detect result being less than a threshold value.

16. The receiver of claim 15, wherein the control circuit is further configured to suspend adjustment of the phase interpolator code in response to the average phase detect result being greater than the threshold value.

17. The receiver of claim 16, wherein the control circuit is further configured to determine that the data phase is locked to a center of a data eye after suspending adjustment of the phase interpolator code.

18. The receiver of claim 15, wherein the phase detector comprises a plurality of bang-bang phase detectors, and wherein the phase detect result signal is a combination of phase detect results output by the plurality of bang-bang phase detectors.

19. The receiver of claim 15, wherein the control circuit is configured to perform at least one adjustment of the phase interpolator code while the average phase detect result is less than the threshold value.

20. The receiver of claim 15, wherein the control circuit is configured to adjust the phase interpolator code further in response to a determination that the data phase has not been locked to a center of a data eye.

* * * * *